United States Patent [19]

Kessel et al.

[11] Patent Number: 5,217,805
[45] Date of Patent: Jun. 8, 1993

[54] UV-CURABLE SILICON RELEASE COMPOSITIONS

[75] Inventors: Carl R. Kessel; Daniel K. McIntyre, both of St. Paul, Minn.

[73] Assignee: Minnesota Mining and Manufacturing Company, St. Paul, Minn.

[21] Appl. No.: 775,833

[22] Filed: Oct. 15, 1991

[51] Int. Cl.$^5$ .............. C08F 2/50; B32B 7/12; C08G 77/04
[52] U.S. Cl. ..................... 428/352; 522/31; 522/170; 522/172; 522/27
[58] Field of Search .............. 522/31, 170; 528/27; 428/42, 352

[56] References Cited

U.S. PATENT DOCUMENTS

| | | | |
|---|---|---|---|
| 2,607,711 | 8/1952 | Hendricks | 117/122 |
| 2,876,394 | 3/1959 | Dahlquist et al. | 206/59 |
| 3,342,625 | 9/1967 | Grossman et al. | 117/68.5 |
| 3,527,659 | 8/1970 | Keil | 117/145 |
| 3,770,687 | 11/1973 | Mestetsky | 260/30.4 |
| 3,997,702 | 12/1976 | Schurb et al. | 428/352 |
| 4,279,717 | 7/1981 | Eckberg et al. | 204/159.13 |
| 4,313,988 | 2/1982 | Koshar et al. | 428/40 |
| 4,547,431 | 10/1985 | Eckberg | 428/413 |
| 4,576,999 | 3/1986 | Eckberg | 525/476 |
| 4,684,709 | 8/1987 | Ona et al. | 528/15 |
| 4,822,687 | 4/1989 | Kessel et al. | 428/447 |
| 4,952,657 | 8/1990 | Riding et al. | 528/27 |
| 4,954,364 | 9/1990 | Stein et al. | 528/54.1 |
| 4,988,741 | 1/1991 | Stein | 522/31 |
| 4,994,299 | 2/1991 | Stein et al. | 427/54.1 |

*Primary Examiner*—Marion E. McCamish
*Assistant Examiner*—Susan Berman
*Attorney, Agent, or Firm*—Gary L. Griswold; Walter N. Kirn; Lorraine R. Sherman

[57] ABSTRACT

Ultraviolet radiation curable controllable release composition comprises polyepoxypolysiloxane, silicone-free polyfunctional epoxide normally incompatible with the epoxypolysiloxane, and compatibilizing monofunctional epoxide. The composition is useful as a release layer in adhesive roll and sheet materials.

18 Claims, 3 Drawing Sheets

UV-CURABLE SILICON RELEASE COMPOSITIONS

FIELD OF THE INVENTION

This invention relates to compositions comprising epoxypolysiloxanes and nonsilicone-containing epoxides useful as release coatings for adhesive roll and sheet materials.

BACKGROUND OF THE INVENTION

Coatings having specific release properties toward adhesives are widely used. Polydimethylsiloxanes and polymers containing predominately dimethylsiloxane units provide very low release coatings, e.g., they exhibit release of 4 to 16 grams per centimeter of width, for products such as labels or large sheets which contain normally tacky and pressure-sensitive adhesives. These polymers are less useful as release coatings on the back surface of adhesive tape (back surface coating of adhesive tape is known as "low adhesion backsize (LAB)) because their low release force can cause roll instability. LABs for tapes in roll form ideally exhibit release toward the adhesive of about 60 to 350 g/cm of width. Polymers with higher release values make it increasingly difficult to use the tape and delamination of the adhesive from the substrate often can result. Coatings having release values less than 60 g/cm of width are useful as components for release liners. Many non-silicone polymers, e.g., urethanes, find use as low adhesion backsizes for pressure-sensitive tapes because of their much higher release force than the polydimethylsiloxanes, typically greater than 200 g/cm width. Such non-silicone LAB coatings are exemplified in U.S. Pat. Nos. 2,607,711, 2,876,894, and 3,342,625.

For products such as tapes and liners, coatings having specific release properties toward adhesives, which are intermediate between those of the polydimethylsiloxanes and conventionally used non-silicone LAB coatings, are highly desired. Many previous attempts to provide such coatings by modification of polydimethyl siloxanes or blending them with less effective release material, as disclosed in, for example, U.S. Pat. Nos. 3,328,482, 3,527,659, 3,770,687, and 3,997,702 have not met with total success because of many problems as: (1) incompatibility of components causing extensive migration of the silicone to the surface, (2) contamination of the adhesive with low molecular weight components giving adhesion loss, (3) nonreproducibility, e.g., inability to consistently achieve the desired release level, and (4) use of excessively high cure temperatures causing deterioration of the heat-sensitive substrate or tape backing.

U.S. Pat. No. 4,822,687 provides release compositions using epoxypolysiloxanes useful in the present invention.

Coating compositions that provide intermediate release (also called controllable release and differential release) properties towards adhesives, more recently, have been prepared from modifications of epoxypolysiloxanes either by introduction of organic groups into the backbone of the epoxypolysiloxane or by copolymerization of the epoxypolysiloxane with copolymerizable monomer. Epoxypolysiloxanes modified by introduction of polyoxyalkylene groups is described in U.S. Pat. No. 4,684,709; by introduction of phenolic compounds is described in U.S. Pat. Nos. 4,952,657 and 4,954,364; and by introduction of haloarylalkylsiloxy groups in U.S. Pat. No. 4,994,299.

Coating compositions providing differential release utilizing copolymerization of the epoxypolysiloxane with epoxysilanes is described in U.S. Pat. Nos. 4,279,717 and 4,313,988 and with a styrene compound in U.S. Pat. No. 4,988,741.

In U.S. Pat. No. 4,547,431 there are described differential release compositions utilizing copolymerization of epoxy functional polydiorganosiloxane silicone fluids (apparently limited to pre-crosslinked silicone fluids having up to about 20% by weight of epoxyfunctional groups) and a small amount (up to 20% by weight) of a polyfunctional epoxy monomer or mixture of monomers and photocatalyst that must be capable of dissolving or dispersing well in the epoxyfunctional silicone release composition. In U.S. Pat. No. 4,576,999 differential release compositions are described that utilize the copolymerization of precrosslinked epoxy-functional silicone fluids and epoxidized α-olefins having 11 through 14 carbon atoms and also to the copolymerization of these silicone fluids with diepoxides that must be miscible with both the epoxy-functional silicone fluid and the onium salt photocatalyst.

SUMMARY OF THE INVENTION

Briefly, the present invention provides an ultraviolet radiation-curable controllable release composition which is a compatible mixture comprising
a) an incompatible mixture comprising
 1) a polyepoxypolysiloxane fluid and
 2) a silicone-free polyfunctional epoxy compound, preferably having a molecular weight above about 200, that is incompatible with the polyepoxypolysiloxane fluid,
b) a compatibilizing amount of a monofunctional epoxy compound, preferably having a molecular weight below about 300, and
c) an effective amount of a photoinitiator for ultraviolet activated cationic polymerization.

In another aspect, the invention also provides a composite structure comprising a substrate bearing a cured layer of the compatible ultraviolet radiation cured controllable release composition on one or both sides of the substrate and an adhesive layer.

In this application, the term "compatible" is used to describe mixtures of two or more components that remain clear with no separation of phases after thorough mixing and allowing to stand at about 25° C. for about 24 hours. The term "incompatible" is used to describe mixtures of two or more components that become cloudy or separate into phases after thorough mixing and allowing to stand for about 24 hours. The term "controllable release" is used to describe compositions whose release properties can be readily changed by changing the ratio of a polyepoxypolysiloxane, a silicone-free polyfunctional epoxide compound, and monofunctional epoxy compound.

In none of the art described above or in any other art of which Applicants are aware is it recognized that useful controllable release coating compositions comprising a polyepoxypolysiloxane fluid and silicone-free polyfunctional epoxy compound initially insoluble and thus incompatible with the polyepoxypolysiloxane fluid can be obtained by the addition to the incompatible mixture of a compatabilizing amount of a monoepoxy compound. As discussed above, U.S. Pat. No. 4,576,999 indicates that when the polyfunctional epoxy compound is not miscible with the epoxy functional silicone useful release coatings are not obtained. Surprisingly, we have found a way in which large amounts of silicone-free polyfunctional epoxy compounds can be used in controllable release compositions.

DETAILED DESCRIPTION OF THE INVENTION

The ultraviolet radiation-curable controllable release composition of the invention comprises three principal components: (1) a polyepoxypolysiloxane, (2) a silicone-free polyepoxide that is incompatible with the polyepoxypolysiloxane, and (3) a compatibilizing amount of a monoepoxide.

The controllable release composition of the invention preferably comprises a composition of
a) x parts by weight of polyepoxypolysiloxane;
b) y parts by weight of silicone-free polyfunctional epoxy compound;
c) z parts by weight of a monofunctional epoxy compound, wherein
x is 5% to 95% of (x+y) and y is 95% to 5% of (x+y),
z has a value between w and 50, preferably between w and 30 inclusively, in which w is the least parts by weight required to compatibilize the incompatible mixture of x parts of epoxy polysiloxane and y parts of polyfunctional epoxy compound, and
x+y+z=100.

Any polyepoxypolysiloxane useful in compositions for providing release, such as those described in U.S. Pat. Nos. 4,313,988 and 4,822,687 (which are incorporated herein by reference for this purpose) and having the following average formula, may be used in the compositions of the invention:

wherein
R is a lower alkyl group of one to three carbon atoms,
$R^1$ is a monovalent hydrocarbyl group of 4 to 20 carbon atoms,
E is a monovalent epoxy-containing hydrocarbyl group,
a, b, and c are independently 0 or a number having a value up to about 20,000, the sum (a+b+c) being 0 or a number having a value up to about 20,000; and
M is a silyl group $R_d R^1_e E_f Si-$ in which d, e, and f are independently 0, 1, 2, or 3 and the sum (d+e+f) is equal to 3;
with the proviso that when c is 0 then M is $R_g R^1_h E_j-$ Si- in which g and h are equal to 0, 1, or 2 and j is 1, 2, or 3 and the sum (g+h+j) is equal to 3.

Preferably, the monovalent epoxy-containing hydrocarbyl group, E, for Formula I contains at least one polymerizable epoxy group, the remainder being composed of carbon and hydrogen free of acetylenic unsaturation and in addition to the oxirane oxygen can contain ether or ester oxygen, and more preferably is selected from oxiranyl-substituted aliphatic groups having the formulae:

II

III

IV

V

VI

VII

VIII

IX

Illustrative examples of the monovalent hydrocarbyl group, $R^1$, in the above Formula I are alkyl groups such as butyl, isobutyl, tert-butyl, hexyl, octyl and octadecyl; aryl groups such as phenyl, napththyl and bisphenyl; alkaryl groups such as tolyl and xylyl; aralkyl groups such as phenylmethyl, phenylethyl, phenylpropyl and phenylhexyl; and cycloaliphatic groups such as cyclopentyl, cyclohexyl and 3-cyclohexylpropyl; and ether oxygen- or ester oxygen-containing groups such as ethoxypropyl, butoxybutyl, and ethoxycarbonylpropyl and the like.

The siloxy groups are ordered or randomly arranged in the epoxypolysiloxane.

Preferred epoxypolysiloxanes and their preparation of use in the compositions of the invention are described in U.S. Pat. No. 4,822,687 and have a molecular weight of from 230 to about $15 \times 10^6$, wherein the epoxy-substituted siloxane units are substituted by an oxiranyl group-substituted monovalent, non-cyclic, linear or branched aliphatic group, said epoxypolysiloxane being free of epoxy containing cycloaliphatic group substituted siloxane units.

Any polyfunctional epoxy compound that is silicone-free and is incompatible with the polyepoxypolysiloxane in the absence of monofunctional epoxy compound, and preferably has a molecular weight above 200, and preferably has a melting point below about 30° C., can be used in the controllable release composition of the invention. Included among such silicone-free polyfunctional epoxy compounds are:

di(2,3-epoxypropyl) isophthalate,
1-(2,3-epoxypropyl)-2-(2,3-epoxypropoxy)benzene,
di(2,3-epoxypropyl)adipate,
1,3-bis(2,3-epoxypropoxy)benzene,
1,3,5-tris(2,3-epoxypropoxy)benzene,
2,2-bis[4-(2,3-epoxypropoxy)phenyl]propane,
2,2-bis[4-(2,3-epoxypropoxy)phenyl]ether,
polyglycidyl ether of phenol-formaldehyde novolac,
3,4-epoxycyclohexylmethyl 3,4-epoxycyclohexanecarboxylate,
1,4-bis(2,3-epoxypropoxy)butane,
1,2,3-tris(2,3-epoxypropoxy)propane,
2,2-bis[4-(2,3-epoxypropoxy)cyclohexyl]propane,
4-(1,2-epoxyethyl)-1,2-epoxycyclohexane,
2-(3,4-epoxycyclohexyl)-5,5-spiro-3,4-epoxy cyclohexane-meta-dioxane bis(3,4-epoxycyclohexyl) adipate, and
1,2-8,9-diepoxy-p-menthane (named by Chem. Abstracts: 1-methyl-4-(2-methyloxiranyl)-7-oxabicyclo(4.1.0)heptane).

Blends of silicone-free polyepoxide resins with reactive diluents can be used in the compositions of the invention when the blend is incompatible with the polyepoxypolysiloxane. Included among such blends are materials such as UVR TM 6100, UVR TM 6200, and UVR TM 6379 available from Union Carbide Corp. (Danbury, Conn.).

Any silicone-free monofunctional epoxy compound that preferably has a molecular weight below about 300 can be used in the controllable release composition. Included among such monofunctional epoxy compounds, for example, are butyl 2,3-epoxypropyl ether (named butyloxymethyloxirane by Chem. Abstracts), hexyl 2,3-epoxypropyl ether,
phenyl 2,3-epoxypropyl ether,
4-methylphenyl 2,3-epoxypropyl ether,
3-(2,3-epoxypropoxy)propyltrimethoxysilane,
1,2-epoxyoctane,
2,3-epoxyoctane,
1,2-epoxydecane,
1,2-epoxydodecane (named decyloxirane by Chem. Abstracts),
1,2-epoxytetradecane, and
1,2-epoxyhexadecane.

Preferred monofunctional epoxy compounds are 1,2-epoxydodecane, 1,2-epoxytetradecane, and 1,2-epoxyhexadecane that are available from Viking Chemical (Atochem North America, Philadelphia, Pa.) as Viklox TM -12, -14, and -16 respectively.

Photoinitiators suitable for use in the controllable release composition of the invention are any of the known epoxy initiators including onium salts of a complex halogen acid, particularly the polyaromatic iodonium and sulfonium salts having $SbF_6$, $SbF_5OH$, $PF_6$, $BF_4$, or $AsF_6$ anions, as are disclosed in U.S. Pat. No. 4,101,513. Preferred photoinitiators are the iodonium and sulfonium salts most preferably having the $SbF_6$ anion. Also useful photoinitiators are organometallic complex salts which are disclosed in U.S. Ser. No. 06/443,660, now allowed, and supported photoinitiators for the actinic radiation activated polymerization of cationically-polymerizable compounds described in U.S. Pat. No. 4,677,137, both of which are incorporated herein by reference.

The amount of photoinitiator useful to provide ideal release coatings can range from about one to five percent by weight of the total weight of the three principal components. A supported photoinitiator, which may contain 0.005 to 5 parts by weight of onium salt photoinitiator per part of support material, can be used in an amount from about 0.005 to 20 parts, preferably 1.0 to 10 parts per 100 parts of total components.

Suitable ultraviolet radiation for curing coatings of the controllable release composition can be obtained from both high and medium pressure mercury vapor lamps, black light lamps and the like. Exposure necessary to effect the cure depends on the concentration of photoinitiator, the particular polyepoxypolysiloxane, mono and polyepoxides in the composition, the depth of the composition, and the wavelength of the ultraviolet (wavelengths of 200 to 400 nm are preferred although by including select spectral sensitizers, wavelengths up to about 600 nm can be used. Generally, the exposure time ranges from about 1 second or less to about 10 minutes. Useful sensitizers include 2-isopropylthioxanthone, 1,3-diphenyl-2-pyrazoline, and 1,3-diphenylisobenzofuran. Other useful sensitizers are disclosed in U.S. Pat. No. 4,250,053, which is incorporated herein by reference. Effective amount of spectral sensitizer can be in the range of 0.01 to 10 parts, preferably about 0.05 to 1.0 parts per part of photoinitiator.

In the practice of the invention, the polyepoxypolysiloxane, incompatible polyfunctional epoxide, compatibilizing monofunctional epoxide and photoinitiator are mixed, and when needed to provide a viscosity suitable for coating, an organic solvent is added. The composition is coated onto a substrate and exposed to ultraviolet radiation in the range of about 0.05 to about 1.5 joules per square centimeter of coating. It is sometimes desirable to apply thermal energy during or after the radiation.

Figure 1:
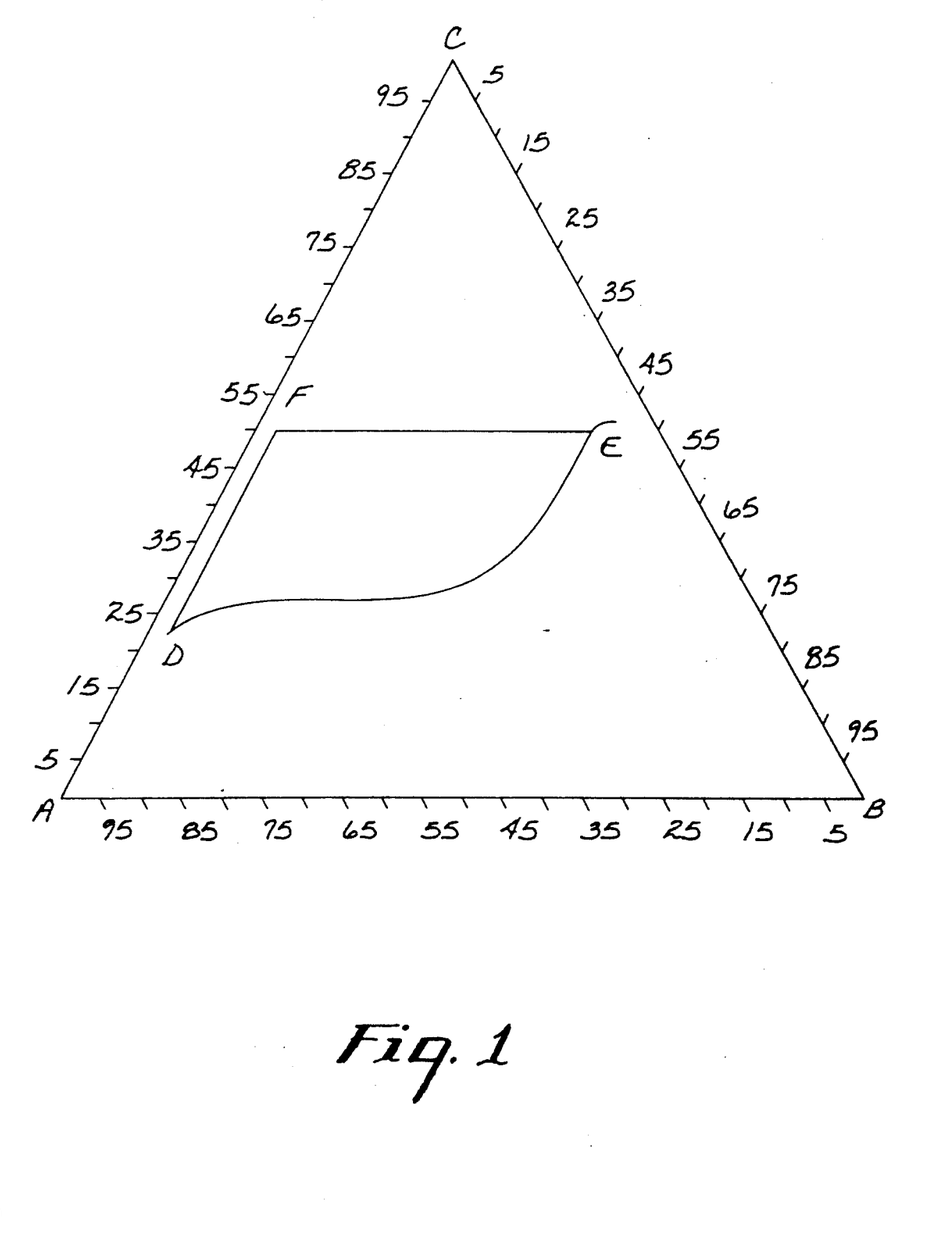
FIGS. 1, 2, and 3 are triangular coordinate graphs showing the areas of compatibility and incompatibility for various compositions of polyepoxypolysiloxane, silicone-free polyepoxide, and monoepoxide.
Figure 2:
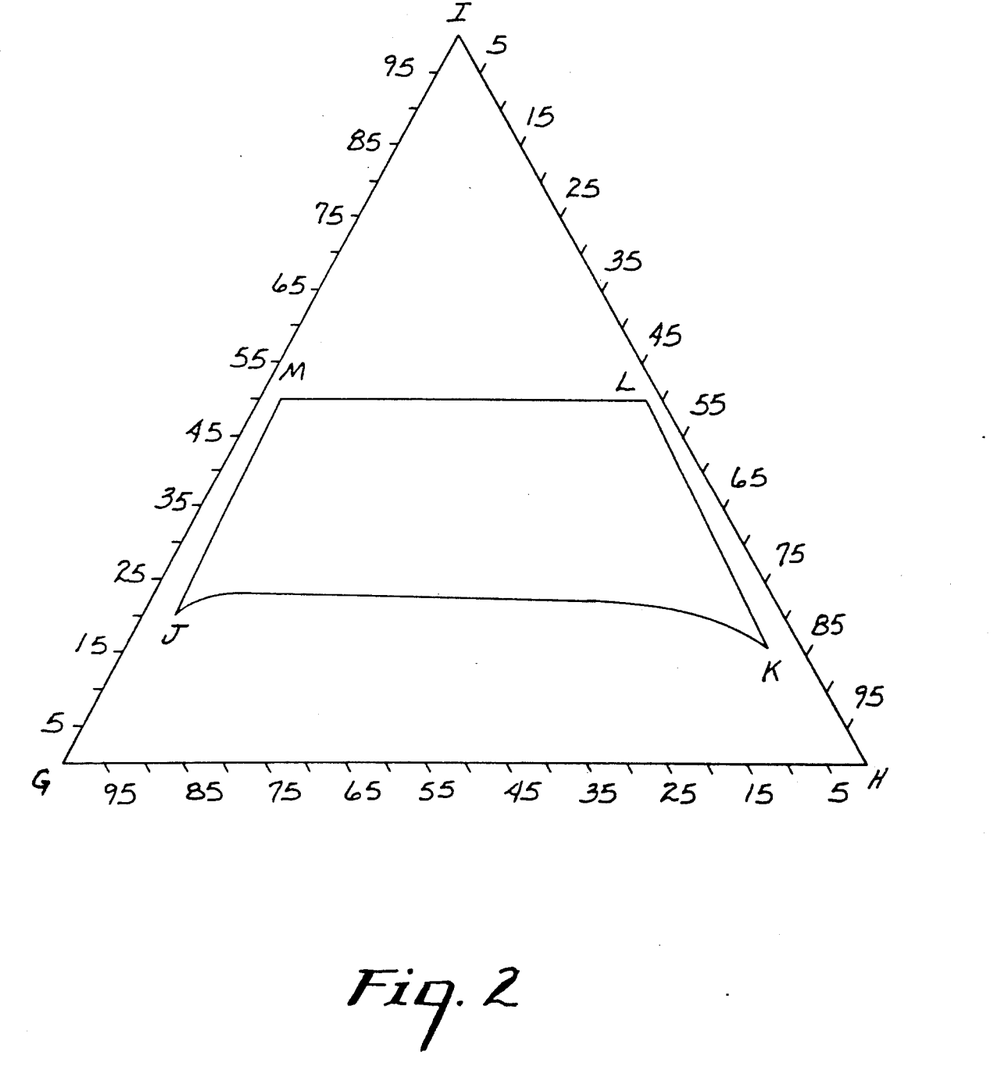
Figure 3:
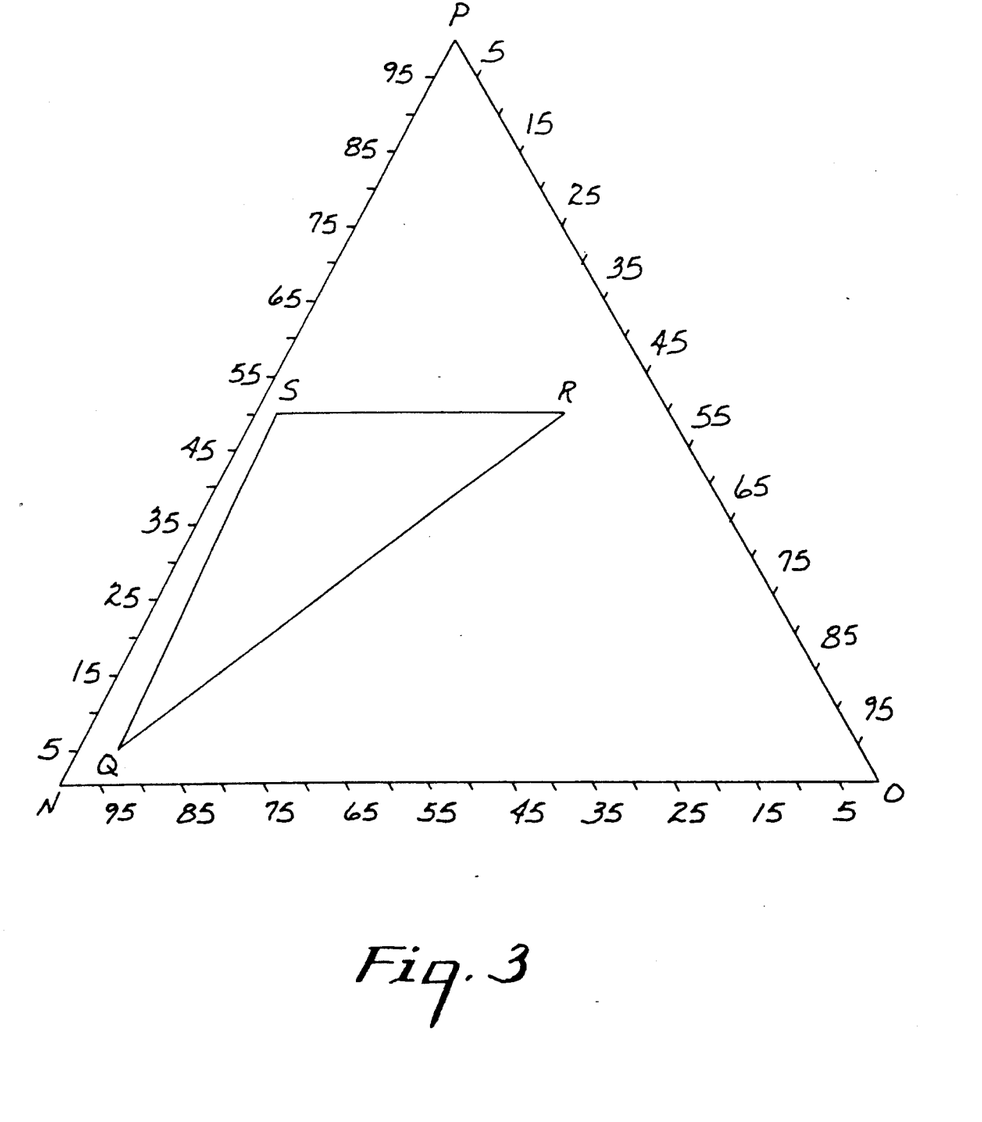

Examples of suitable ultraviolet radiation-curable compositions of the invention are shown in FIG. 1–FIG. 3. In each of the figures there are presented by triangular coordinate graphs compatible and incompatible compositions of polyepoxypolysiloxane, silicone-free polyepoxide, and monoepoxide. In FIG. 1 point A of the graph is 100 percent polyepoxypolysiloxane, prepared according to U.S. Pat. No. 4,822,687, method of Examples 1–7, having the formula Point B is 100 percent silicone-free polyfunctional epoxy compound, 3,4-epoxycyclohexylmethyl 3,4-epoxycyclohexanecarboxylate (available as ERL TM 4221 epoxy resin from Union Carbide Corp.). Point C is 100 percent monofunctional epoxy compound, 4-methylphenyl 2,3-epoxypropyl ether (available as Ataldit TM DYO23 epoxy resin from Ciba-Geigy). Composition above curve DE are compatible while compositions below curve DE are incompatible. The area bound by D, E, and F represents compositions useful as radiation curable controlled release compositions of the invention.

In FIG. 2, Point G is 100 percent of the above polyepoxypolysiloxane, Point H is 100 percent ERL 4221 epoxy resin, and Point I is 100 percent monofunctional epoxy compound 3-(2,3-epoxypropyoxy)-propyltrimethoxysilane, available as Z-6040 TM from Dow Corning Corp., Midland, Mich. Compositions above curve JK are compatible and compositions below JK are incompatible. The area bound by JKL and M represent compositions useful as radiation-curable controlled release compositions.

In FIG. 3, Point N is 100 percent of the above polyepoxypolysiloxane, Point O is diglycidyl ether of bisphenol A (DER TM 332, available from Dow Chemical U.S.A., Midland, Mich.), and Point P is 1,2-epoxytetradecane (Vikolox TM 14 epoxidized olefin, available from Atochem North America, Inc.). Compositions above curve QR are compatible and those below curve QR are incompatible. The area bound by QRS represent compositions useful as radiation curable controlled release compositions.

Solvents to assist in coating can be used but their use is not preferred. Such solvents, present in an effective amount, include nonpolar organic liquids such as ethyl acetate, isopropyl acetate, acetone, methyl ethyl ketone, heptane, toluene, and mixtures thereof. The exact coating technique is not especially critical and any of several well known procedures can be used. Wirewound rods, such as a Meyer bar, or a rotogravure applicator roll having, for example, 80 lines per cm, provide uniform coatings. Optionally, a mixing spray nozzle having a line for the epoxypolysiloxane fluid or solution and separate line for the catalyst solution can be used.

Substrates to which the release layer of the invention can be applied include organic substrates of wood, fiberboard, particle board, paper and cardboard; woven and non-woven organic and inorganic fibers; synthetic and natural polymers such as polyolefins, polyesters, polyamides, cured phenolics, urea-aldehyde resins, poly(vinyl halides), polyacrylates, polyurethanes, proteins, rubber; and inorganic substrates which include metals such as iron, stainless steel, copper, brass, bronze, aluminum, titanium, nickel, zinc and alloys.

Ultraviolet radiation curable controllable release compositions of the invention are particularly suitable for preparing release liners of use with adhesive roll and sheet materials. For this use, a substrate of paper or a film of polymer such as, for example, polyester, polyamide, polyolefin, etc., is used as the tape backing.

Objects and advantages of this invention are further illustrated by the following examples, but the particular materials and amounts thereof recited in these examples, as well as other conditions and details, should not be construed to unduly limit this invention. Temperatures are expressed in degrees Centigrade and parts are parts by weight.

EXAMPLES

Examples 1–6

Compositions of polyepoxypolysiloxane, incompatible silicone-free polyepoxide, compatibilizing monoepoxide, and photoinitiator were mixed according to the amounts shown in Table I giving a clear homogeneous solution. The compositions were coated onto biaxially oriented polypropylene (BOPP) at a thickness of 0.5 to 1.0 micrometers using a 5-roll coater at 50 ft/min (15.25 m/min) and cured by passing under one medium pressure mercury UV lamp (from Fusion Systems Corp., Rockville, Md.) operating at low power installed in a 10 ft. (3m) oven heated at about 60° C. Release values were obtained by casting a solvent based acrylic pressure-sensitive adhesive directly onto the cured surface, drying at 70° C. for 5 minutes and laminating a 50 micrometer polyethylene terephthalate (PET) film to the adhesive layer. "Initial" release (in grams per cm) is the force necessary to peel the polyethylene terephthalate (PET)-adhesive layer from the release surface of the cured composition at a 180° angle after the laminate had been held at room temperature (25° C.) for three days. "Aged" release (in grams per cm) is the force required to peel the PET-adhesive layer from the release surface after the laminate had been held at 70° C. for three days. The data obtained is shown in Table I

TABLE I

| Coating Composition | Example No. | | | | | |
| --- | --- | --- | --- | --- | --- | --- |
| | 1 | 2 | 3 | 4 | 5 | 6 |
| polyepoxypolysiloxane | | | | | | |
| A wt % | 39.5 | 36 | 53 | 57 | | |
| B wt % | | | | | 47 | |
| C wt % | | | | | | 45 |
| incompatible silicone-free polyepoxide | | | | | | |
| D wt % | 39.5 | 36 | 21 | | 23 | |
| E wt % | | | | 15 | | |
| F wt % | | | | | | 22 |
| compatibilizing monoepoxide | | | | | | |
| G wt % | 17 | | | 24 | 26 | 29 |
| H wt % | | 24 | | | | |
| I wt % | | | 22 | | | |
| photoinitiator | | | | | | |
| J wt % | 4 | 4 | 4 | 4 | 4 | 4 |
| release data | | | | | | |
| initial grams/cm | 136 | 130 | 114 | 142 | 18 | 20 |
| aged grams/cm | 126 | 181 | 108 | 127 | 18 | 25 |

A is polyepoxypolysiloxane of Formula I, above, in which R is methyl, a is 33.3, b is 0, c is 16.7, and E is an epoxy group of Formula IV, above, the polyepoxypolysiloxane having an epoxy equivalent weight (EEW) of 330, prepared according to the procedure of U.S. Pat. No. 4,822,687, Example 1–7.

B is polyepoxypolysiloxane of Formula I, above, in which R is methyl, a is 54.4, b is 0, c is 15.6, and E is an epoxy group of Formula IV, above, the polyepoxypolysiloxane having an EEW of 445 prepared according to the procedure of U.S. Pat. No. 4,822,687, Example 1-7.

C is polyepoxypolysiloxane of Formula I, above, in which R is methyl, a is 42.8, b is 0, c is 7.2 and E is an epoxy group of Formula IV, above, the polyepoxypolysiloxane having an EEW of 635 prepared according to the procedure of U.S. Pat. No. 4,822,687, Example 1-7.

D is the polyepoxide, 3,4-epoxycyclohexylmethyl 3,4-epoxycyclohexane carboxylate, available from Union Carbide as ERL 4221 epoxy resin.

E is the polyepoxide, 2,2-bis-[4-(2,3-epoxypropoxy)-phenyl]propane, available from Dow Chemical USA as DER 332 epoxy resin.

F is a blend of cycloaliphatic epoxy resins available from Union Carbide as UVR 6100 ™ epoxy resin.

G is the monoepoxide, 1,2-epoxytetradecane, available from Atochem North America, Inc. as Vikolox 14 epoxy resin.

H is the monoepoxide, 3-(2,3-epoxypropoxy)propyl-triethoxysilane, available from Dow Corning Corp. as Z-6040 ™ epoxy resin.

I is the monoepoxide, 4-methylphenyl 2,3-epoxypropyl ether, available from Ciba-Geigy Corp. (Basil, Switzerland) as Araldite DY023 epoxy resin.

J is the cationic photoinitiator available from GE Co. (Fairfield, Conn.) as UV 9310c ™ photointiator.

The data of TABLE I show varying release performance can be achieved using compositions of the invention, all of which showed acceptable aging characteristics.

Examples 7-9

These examples illustrate the benefit of compatibility on cure rate of epoxypolysiloxane coatings. Three formulations were prepared as shown in TABLE II. Each of the three was coated approximately 1 micrometer thick onto biaxially oriented polypropylene film, and cure rate was determined by placing the coatings onto a conveyor belt which passed under a medium pressure mercury lamp (QC1202 ™ UV Processor, PPG Industries, Inc. (Pittsburgh, Pa.) 1 lamp running at 300 watts/inch). "Cure" was evaluated by laminating a piece of Scotch ™ 610 tape (3M, St. Paul, Minn.) to the sample using firm finger pressure 15 seconds after the sample was removed from the processor. Silicone transfer to the tape was evaluated by forming the length of tape into a loop with the adhesive side in, lightly touching the ends of the loop together so that the adhesive layers were in contact, and pulling the two ends apart slowly. Significant silicone transfer was indicated when the adhesive popped apart; if there was not significant silicone transfer the adhesive layers would remain in contact as the loop ends were pulled apart. "Cure rate" was determined as the fastest speed which the sample could be passed under the UV lamp and still pass the tape test.

TABLE II

| Component | 7 | 8 | 9 |
| --- | --- | --- | --- |
| epoxypolysiloxane A (TABLE I footnote) | 96 | 48 | 39.5 |
| (ERL-4221 silicone-free polyepoxy resin) | | 48 | 39.5 |
| (Vikolox 14 monoepoxide) | | | 17 |
| (UV9310c photoinitiator) | 4 | 4 | 4 |
| Compatibility | Clear | Opaque | Clear |
| cure rate (m/min) | 73 | 64 | 91 |

These examples show clearly that the addition of ERL4221 silicone-free polyepoxy resin to an epoxypolysiloxane, which increases the cure rate in the compatible blend (Example 9 vs. Example 7) actually results in a decrease in cure rate when the blend is incompatible.

Various modifications and alterations of this invention will become apparent to those skilled in the art without departing from the scope and spirit of this invention, and it should be understood that this invention is not to be unduly limited to the illustrative embodiments set forth herein.

We claim:

1. An ultraviolet radiation curable controllable release composition comprising a compatible mixture comprising a) an incompatible mixture of (1) x parts by weight of a polyepoxypolysiloxane fluid and (2) y parts by weight of a silicone-free polyfunctional epoxy compound, b) z parts by weight of a compatibilizing amount of a monofunctional epoxy compound, and c) an effective amount of a photoinitiator for ultraviolet activated cationic polymerization wherein x is 5% to 95% of (x+y) and y is 95% to 5% of (x+y), z has a value between w and 24, in which w is the least parts by weight required to compatibilize the incompatible mixture of x parts of epoxy polysiloxane and y parts of polyfunctional epoxy compound, and x+y+z=100.

2. The controllable release composition according to claim 1 wherein the epoxypolysiloxane has the following average formula:

wherein
R is a lower alkyl group of one to three carbon atoms,
$R^1$ is a monovalent hydrooarbyl group of 4 to 20 carbon atoms,
E is a monovalent epoxy-containing hydrocarbyl group,
a, b, and c are independently 0 or a number having a value up to about 20,000, the sum (a+b+c) being 0 or a number having a value up to about 20,000; and
M is a silyl group $R_d R^1_e E_f Si-$ in which d, e, and f are independently 0, 1, 2, or 3 and the sum (d+e+f) is equal to 3;
with the proviso that when c is 0 then M is $R_g R^1_h E_j Si-$ in which g and h are equal to 0, 1, or 2 and j is 1, 2, or 3 and the sum (g+h+j) is equal to 3.

3. The composition according to claim 2 wherein E further comprises ether or ester oxygen.

4. The composition according to claim 2 wherein E is an oxiranyl group-substituted monovalent linear or branched aliphatic group.

5. The composition according to claim 1 wherein said polyfunctional epoxy compound is selected from the group consisting of di(2,3-epoxypropyl) isophthalate,
1-(2,3-epoxypropyl)-2-(2,3-epoxypropoxy)benzene,
di(2,3-epoxypropyl)adipate,
1,3-bis(2,3-epoxypropoxy)benzene,
1,3,5-tris(2,3-epoxypropoxy)benzene,
2,2-bis[4-(2,3-epoxypropoxy)phenyl]propane,
2,2-bis[4-(2,3-epoxypropoxy)phenyl]ether,
polyglycidyl ether of phenol-formaldehyde novolac,
3,4-epoxycyclohexylmethyl 3,4-epoxycyclohexanecarboxylate,
1,4-bis(2,3-epoxypropoxy)butane,
1,2,3-tris(2,3-epoxypropoxy)propane,
2,2-bis[4-(2,3-epoxypropoxy)cyclohexyl]propane,
4-(1,2-epoxyethyl)-1,2-epoxycyclohexane,
1,2-8,9-diepoxy-p-menthane, and
2-(3,4-epoxycyclohexyl)-5,5-spiro-3,4-epoxy cyclohexane-meta-dioxane bis(3,4-epoxycyclohexyl) adipate.

6. the composition according to claim 5 wherein said silicone-free polyfunctional epoxy compound is a blend of silicone-free polyepoxy resins with reactive diluents, the blend being incompatible with polyepoxypolysiloxane fluids.

7. The composition according to clam 1 wherein said monofunctional epoxide is selected from the group consisting of butyl 2,3-epoxypropyl ether,
hexyl 2,3-epoxypropyl ether,
phenyl 2,3-epoxypropyl ether,
4-methylphenyl 2,3-epoxypropyl ether,
3-(2,3-epoxypropoxy)propyltrimethoxysilane,
1,2-epoxyoctane,
2,3-epoxyoctane,
1,2-epoxydecane,
1,2-epoxydodecane,
1,2-epoxytetradecane, and
1,2-epoxyhexadecane.

8. The composition according to claim 7 wherein said monofunctional epoxide is selected from the group consisting of 1,2-epoxydodecane, 1,2-epoxytetradecane and 1,2-epoxyhexadecane.

9. The composition according to clam 1 wherein said photoinitiator is an onium salt of a complex halogen acid.

10. The composition according to claim 9 wherein said onium salt is an iodonium or sulfonium salt.

11. The composition according to clam 1 wherein said photoinitiator is a supported photoinitiator.

12. The composition according to claim 1 further comprising an effective amount of a spectral sensitizer.

13. The composition according to clam 1 further comprising an effective amount of an organic solvent.

14. The cured composition according to claim 1.

15. The composition according to claim 14 which has been cured by radiation in the range of 200 to 600 nm and optionally thermal energy.

16. The cured composition according to claim 14 which is a release coating on a substrate.

17. A release liner comprising a substrate having on at least one surface thereof a layer of the composition according to claim 14.

18. An adhesive tape comprising a layer of the composition according to claim 14. composition according to claim 14.

* * * * *

UNITED STATES PATENT AND TRADEMARK OFFICE
CERTIFICATE OF CORRECTION

PATENT NO. : 5,217,805
DATED : June 8, 1993
INVENTOR(S) : Carl R. Kessel et al.

It is certified that error appears in the above-identified patent and that said Letters Patent is hereby corrected as shown below:

Col. 7, lines 16-17, "Ataldit™" should read -- Ataldite™ --.

Col. 10, line 53, "hydrooarbyl" should read -- hydrocarbyl --.

Col. 11, line 25, "the composition" should read -- The composition --.

Col. 12, line 18, "clam 1" should read -- claim 1 --.

Signed and Sealed this

Twenty-third Day of August, 1994

Attest:

BRUCE LEHMAN

Attesting Officer    Commissioner of Patents and Trademarks